United States Patent
Dane et al.

(10) Patent No.: US 8,320,455 B2
(45) Date of Patent: Nov. 27, 2012

(54) SYSTEM AND METHOD TO PROCESS MOTION VECTORS OF VIDEO DATA

(75) Inventors: Gokce Dane, San Diego, CA (US); Giovanni Motta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 12/398,379

(22) Filed: Mar. 5, 2009

(65) Prior Publication Data

US 2010/0226436 A1 Sep. 9, 2010

(51) Int. Cl.
*H04N 11/02* (2006.01)
*H04N 11/04* (2006.01)
*H04B 1/66* (2006.01)

(52) U.S. Cl. ............ 375/240.16; 375/240; 375/240.24

(58) Field of Classification Search .................. None
See application file for complete search history.

(56) References Cited

U.S. PATENT DOCUMENTS

| | | | | | |
|---|---|---|---|---|---|
| 4,985,768 | A | * | 1/1991 | Sugiyama | 375/240.16 |
| 5,808,678 | A | * | 9/1998 | Sakaegi | 348/333.03 |
| 7,050,504 | B2 | * | 5/2006 | Joch et al. | 375/240.26 |
| 7,376,186 | B2 | * | 5/2008 | Boyce et al. | 375/240.15 |
| 7,613,240 | B2 | * | 11/2009 | Sun et al. | 375/240.16 |
| 7,953,282 | B2 | * | 5/2011 | Kamaguchi | 382/233 |
| 2002/0126752 | A1 | * | 9/2002 | Kim | 375/240.03 |
| 2003/0215016 | A1 | * | 11/2003 | Nishibori et al. | 375/240.16 |
| 2005/0047504 | A1 | * | 3/2005 | Sung et al. | 375/240.2 |
| 2006/0018382 | A1 | | 1/2006 | Shi et al. | |
| 2006/0087563 | A1 | | 4/2006 | Duan | |
| 2007/0242748 | A1 | | 10/2007 | Mahadevan et al. | |
| 2008/0025390 | A1 | | 1/2008 | Shi et al. | |
| 2008/0063077 | A1 | * | 3/2008 | Kondo et al. | 375/240.16 |
| 2008/0123747 | A1 | * | 5/2008 | Lee et al. | 375/240.16 |
| 2008/0181309 | A1 | | 7/2008 | Lee et al. | |
| 2008/0267292 | A1 | | 10/2008 | Ito et al. | |
| 2009/0052534 | A1 | * | 2/2009 | Wang et al. | 375/240.13 |
| 2010/0002009 | A1 | * | 1/2010 | Takata | 345/589 |
| 2010/0232509 | A1 | * | 9/2010 | Incesu et al. | 375/240.16 |
| 2011/0026599 | A1 | * | 2/2011 | Andersson et al. | 375/240.16 |

OTHER PUBLICATIONS

International Search Report and Written Opinion—PCT/US2010/026399, International Search Authority—European Patent Office—Jul. 7, 2010.
Castagno, R. et al., "A Method for Motion Adaptive Frame Rate Up-Conversion," p. 1-24, D.E.E.I, University of Trieste, Italy.
Sasai, Hisao et al., "Frame-Rate Up-Conversion Using Reliable Analysis of Transmitted Motion Information," ICASSP 2004, p. V-257-V260, 2004.
Zhai, Jiefu et al., "A Low Complexity Motion Compensated Frame Interpolation Method," 2005 IEEE, p. 4927-4930, 2005.

* cited by examiner

*Primary Examiner* — Joseph Ustaris
*Assistant Examiner* — Frederick Bailey
(74) *Attorney, Agent, or Firm* — Steven Thiel; Elaine Lo

(57) ABSTRACT

Systems and methods to process motion vectors of video data are disclosed. According to an embodiment, an intra-block in a video frame of the video data is identified. At least a first set and a second set of inter-blocks that neighbor the identified intra-block are identified, where each inter-block in a set of inter-blocks has a motion vector associated therewith. Data of the first and second set of inter-blocks is evaluated to determine an error associated with each of the first and second sets. A motion vector associated with motion vectors of the inter-blocks of the set with the least error is determined. The determined motion vector may be associated with the identified intra-block.

39 Claims, 16 Drawing Sheets

|   |   |   |   |
|---|---|---|---|
| A 1601 | B 1603 |   |   |
| C 1605 | D 1607 |   |
|   | G 1604 |   |
| E 1602 | F 1606 |   |
|   | H 1608 |

FIG. 16

SYSTEM AND METHOD TO PROCESS MOTION VECTORS OF VIDEO DATA

I. FIELD

The present disclosure is generally related to processing motion vectors of video data.

II. DESCRIPTION OF RELATED ART

Advances in technology have resulted in smaller and more powerful computing and video processing devices. For example, there currently exist a variety of portable personal computing devices, including wireless computing devices, such as portable wireless telephones, personal digital assistants (PDAs), and paging devices that are small, lightweight, and therefore easily carried by users. Many of these portable or wireless computing devices also include hardware or software components that enable such a device to provide the function of a digital still camera, a digital video camera, a digital recorder, and an audio file player. Also, such wireless telephones can process executable instructions of software applications, such as a web browser application, that can be used to access the Internet. As such, these wireless telephones and other devices can include significant computing capabilities and image processing capabilities.

Because many devices such as cell phones, PDAs, video players and other devices, can access the Internet and can process and display video, many of these devices can receive video data from the Internet or another network to be processed and displayed by the device. According to the Moving Pictures Expert Group (MPEG) standards and other video processing standards, video data that is transmitted by a video transmitting device is organized as a succession of frames of video data. Video processing of the video data of the moving picture seeks to increase the number of video frames that can be transmitted through a transmission channel per unit of time and to increase the number of frames that can be stored in a storage medium of a given capacity. To achieve these increases in efficiency, a video encoder seeks to minimize the amount of information that must be transmitted and stored to enable substantial reconstruction of the moving picture at a video receiver. In some encoders, each video frame may be divided into 16×16 pixel macro blocks or other block size. Substantial compression of this data may be achieved by applying a Discrete Cosine Transform upon each of four 8×8 pixel sub-blocks of each macro block. Other block sizes may be employed and other transforms may be applied. The resulting transformed image is quantized, encoded and transmitted serially.

Motion processing further reduces the amount of data needed to enable substantial reconstruction of the moving picture at a video receiver by estimating and predicting motion in the video data. Due to motion, the data represented in a block of a frame can be closely matched to a block of data in a previously encoded frame. For example, a moving object can often be identified in adjacent frames of a video stream. The moving object may remain the same, but the position of the moving object may be merely displaced due to the motion. Because the motion of the moving object may, at least, be partially reproduced by changing the position of the data that represents the moving object, the amount of data transmitted to reproduce a video at a receiver may be reduced.

Exploiting the similarity between data in different frames caused by motion, a motion estimator may seek to find the closest matching block between successive frames. A vector in the detected direction of motion of the block with a magnitude equal to the detected amount of motion of the block is called a motion vector. When operating in a differential, "inter-frame" mode, the video encoder transmits the data for a current frame and the motion vectors associated with the blocks from which the adjacent frame can be reconstructed. Thus, less data needs to be transmitted in the inter-frame mode to substantially reconstruct the full frames at the video receiver. When operating in a non-differential, "intra-frame" mode, the video encoder may transmit the current block without motion vectors.

In the inter-frame mode, the video receiver uses each motion vector received in the video data stream to "predict" motion of a block of a frame. In this way, the video receiver reconstructs the frame data for the adjacent frame from the current frame and the motion vector data. The motion vector data can be used to interpolate a frame between frames or extrapolate a frame from the differential frame data. In this way, data can be transmitted at a relatively low frame rate and up-converted at the receiver to a higher frame rate. Accurate reconstruction of the frames in the receiver depends, in part, on the accuracy or reliability of the motion vectors in the received video data stream.

III. SUMMARY

In accordance with embodiments described herein, methods, apparatuses, and computer readable media are disclosed that process video data. For example, embodiments may include cell phones and other video playing devices. In particular, motion vectors in video data received by a video receiver are processed to reconstruct the video data and increase the frame rate of the data. In some embodiments, the received motion vectors of inter-blocks are used to derive motion vectors for intra-blocks.

In a particular embodiment, a method of processing video data is disclosed. The method includes identifying an intra-block in a video frame of the video data. The method also includes identifying a first set and a second set of inter-blocks that neighbor the intra-block. Each inter-block in a set of inter-blocks is associated with a motion vector. The method may include evaluating the data of the first and second sets of inter-blocks to determine which of the first and second sets has a least error associated with the set. In some embodiments, a squared error between motion vectors in the same set is determined. The method further includes determining a motion vector associated with the motion vectors of the inter-blocks in the set with the least error, where the determined motion vector is to be associated with the intra-block.

In another particular embodiment, an apparatus is disclosed for deriving and assigning motion vectors to intra-blocks. The apparatus includes an intra-block identifier to identify an intra-block of a video frame of video data received by the apparatus. The apparatus also includes an inter-block set identifier to identify at least one set of inter-blocks neighboring the intra-block. Each inter-block in a set of inter-blocks is associated with a respective motion vector in the received video data. An error calculator determines an error associated with the data or motion vectors of the inter-blocks in a set for each set. A set selector selects a set with a least error. The apparatus also includes a median vector calculator to determine a median of the motion vectors of the inter-blocks of the selected set, where the median motion vector is to be associated with the identified intra-block.

In another particular embodiment, a computer readable tangible medium includes computer code that causes a computer to identify an intra-block and to derive a motion vector to assign to the intra-block from neighboring blocks. The medium includes computer code that causes a computer to identify an intra-block in a received stream of video data. The medium further includes computer code that causes the computer to identify at least one set of inter-blocks neighboring the intra-block. The medium also includes computer code that causes the computer to determine an error associated with the data of the inter-blocks of each set to determine an error for each set. The medium further includes computer code that causes the computer to select an identified set with a least error or to select the only set if only one set is identified. The medium also includes computer code that causes the computer to determine a median motion vector from motion vectors of the inter-blocks in the selected set, where the median motion vector is to be associated with the intra-block.

In another particular embodiment, an apparatus includes means for determining at least one set of inter-blocks neighboring an intra-block. The apparatus further includes means for determining an error associated with the inter-blocks of the at least one set. The apparatus also includes means for selecting a set based on error associated with the set. The apparatus also includes means for determining a median vector of the motion vectors of the inter-blocks in the selected set, where the median motion vector is to be associated with the intra-block.

Thus, one aspect of the invention provides improved processing of motion vectors to reconstruct and increase the frame rate of video data in comparison to conventional systems.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 16 is a block diagram of an embodiment of blocks adjacent to a boundary of a frame or macro block;

V. DETAILED DESCRIPTION

This written description describes systems and methods for processing motion vectors of compressed video data. In an illustrative embodiment, an intra-block is a block of video data that has no motion vector associated with it in the received video data stream. The methods described herein can also be employed by use of motion vectors estimated at the decoder. When applying these methods for motion vectors estimated at the decoder, intra-blocks are determined as those whose associated distortion metric is above a threshold. In an embodiment, an intra-block is assigned a motion vector derived from the motion vectors of inter-blocks adjacent to the intra-block. More particularly, the intra-block motion vector is derived from the motion vectors of neighboring inter-blocks having a least error associated with the data of the neighboring inter-blocks. Further, processing of motion vectors may include disabling frame rate up-conversion if the video content of a video frames is static. Processing of motion vectors may include determining if panning is present in video content, and if so, performing panning-adaptive processing such as performing bidirectional motion compensated prediction. Processing motion vectors may include determining a measure of spatial and temporal continuity of the motion vectors. These and other aspects of motion vector processing are described herein.

Figure 1:
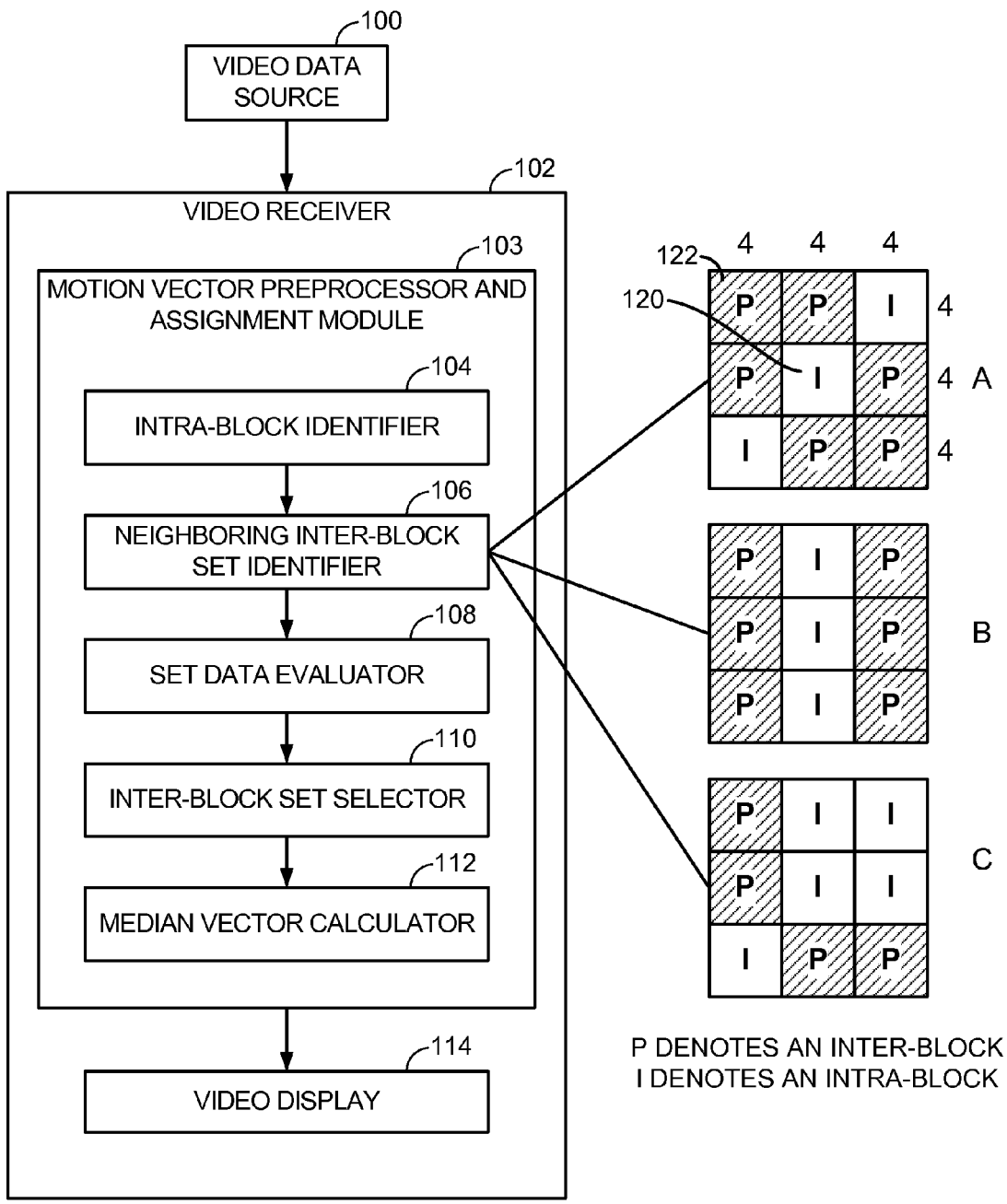
FIG. 1 is a block diagram of an embodiment of a source of video data and a receiver of the video data showing multiple possible sets of inter-blocks neighboring an intra-block.

FIG. 1 is a block diagram of an embodiment of a source of video data and a receiver of the video data. FIG. 1 shows details for identifying sets of inter-blocks neighboring an intra-block and deriving a motion vector from the set of inter-blocks. The derived motion vector will be associated with the intra-block in order to make the processing of moving video more efficient. In FIG. 1, video data is received from a video data source 100. The video data source 100 may be a television station or a website or other source of video data. The video receiver 102 receives the data from the video data source 100, processes the video data and displays the processed video data on a video display 114. Some of the processing of the received video data is performed by a motion vector preprocessor and assignment module 103.

The motion vector preprocessor and assignment module 103 is configured to derive and assign motion vectors to intra-blocks. An intra-block can be a block that has no motion vector associated with it in the received video data. In another scenario where motion vectors are estimated at the decoder, an intra-block can be a block whose motion estimation distortion metric is above a threshold. The motion vector preprocessor and assignment module 103 includes an intra-block identifier 104 that identifies an intra-block in the received video data. A neighboring inter-block set identifier 106 identifies one or more sets of inter-blocks that neighbor the intra-block. An interblock has differential data and has a motion vector associated therewith. In particular, FIG. 1 shows three different patterns A, B and C, of inter-block sets neighboring one or more intra-blocks. A representative intra-block 120 is denoted I, and a representative inter-block 122 is denoted P.

Pattern A is a corner pattern, pattern B is a side pattern, and pattern C is a pattern of adjacent pairs. In some embodiments, each block represents a 4×4 group of pixels. Each pattern shows two sets of shaded inter-blocks neighboring an intra-block. The patterns are chosen based on the configuration of intra-blocks in the data. Other patterns of inter-blocks may be detected.

A set data evaluator 108 evaluates the data of each identified set of inter-blocks to determine an error associated with each identified set. According to an illustrative embodiment, an error associated with each set may be a mean square error of the motion vectors of the inter-blocks of the set. Other error measurements may be employed. For example, a pattern of inter-blocks may contain data that represents minimal transformation of the data between frames because of motion of an object in the frames. An inter-block set selector may then choose the set of inter-blocks having the least error. If there is only one identified set, then the selector 110 selects the only one set. Once a set is selected, a median motion vector calculator 112 computes the median vector of the motion vectors of the inter-blocks of the selected set. The median motion vector is a vector positioned between an upper half of the motion vectors of the inter-blocks and a lower half of the motion vectors of the inter-blocks. This median motion vector is assigned to the intra-block. In some embodiments, the mean value motion vector of the motion vectors of the selected set is assigned to the intra-block. Other measures may be employed.

As functionally described with respect to FIG. 1, in a particular embodiment, the video receiver 102 is an apparatus that includes an intra-block identifier to identify an intra-block of a video frame of video data received by the apparatus, where no motion vector in the received video data is associated with the identified intra-block. The apparatus also includes a neighboring set identifier to identify among eight blocks neighboring the identified intra-block at least one set of inter-blocks neighboring the intra-block. An error calculator determines an error associated with each set of neighboring inter-blocks. A set selector selects a set with a least error or selects the only set when only one set is identified. A median vector calculator determines a median motion vector of the motion vectors of the selected pattern. An assignment module associates the median motion vector with the identified intra-block. By selecting a median motion vector of the motion vectors of the inter-block set having the least error, motion prediction for the intra-block is substantially improved.

Figure 2:
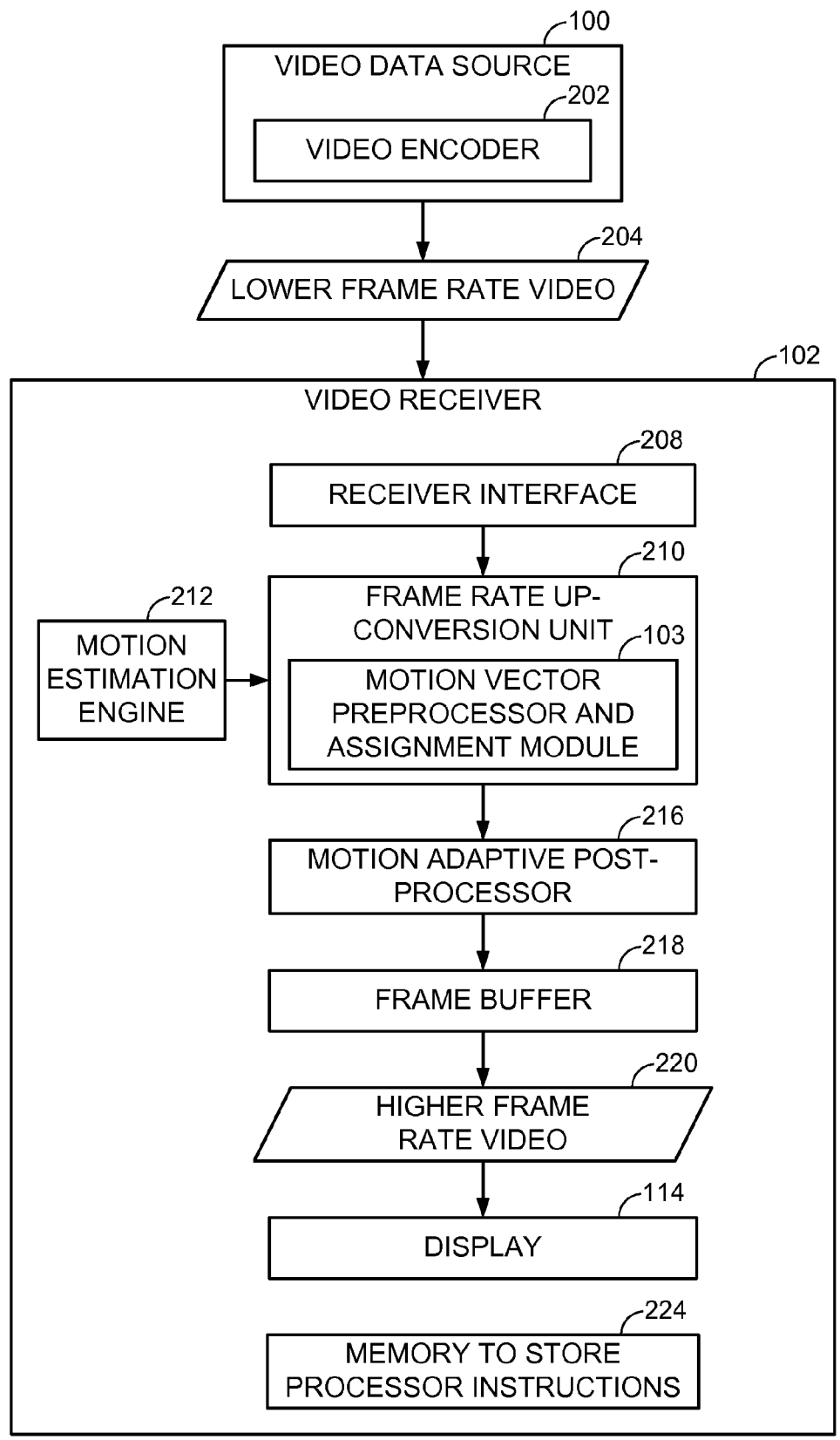
FIG. 2 is a block diagram of the video data source and video receiver of FIG. 1, with greater detail.

FIG. 2 is a detailed view of a particular embodiment of the video data source 100 and the video receiver 102. The video data source 100 includes a video encoder 202 for encoding video data. The video encoder 202 exploits the spatial and temporal redundancy of video data to produce compressed and encoded video data at a low frame rate resulting in lower frame rate video data 204. The lower frame rate video data 204 includes the motion vectors associated with the inter-blocks. The video receiver 102 includes a receiver interface 208 to receive the low frame rate data. In some embodiments, the receiver interface 208 is a wireless transceiver for receiving video data by RF (radio frequency) communications. Thus, the video receiver 102 may receive the lower frame rate video data 204 from the video data source 100. In one embodiment, a frame rate up-conversion unit 210 receives the lower frame rate video data 204 from the receiver interface 208 and generates interpolated frames to increase the frame rate of the video data for display. In some embodiments, the video data is received by a wireline connection.

In some embodiments, the frame rate up-conversion unit 210 includes the motion vector preprocessor and assignment module 103. In other embodiments, the frame rate up-conversion unit 210 includes an entropy decoder 304, described with reference to FIG. 3, and the motion vector preprocessor and assignment module 103 precede the frame rate up-conversion unit. The motion vector preprocessor and assignment module 103 determines a motion vector, such as the median of motion vectors of inter-blocks that neighbor an intra-block, and assigns the determined median motion vector to the intra-block. A motion estimation engine 212 is employed to analyze adjacent frames to produce motion vectors for a frame when processed motion vectors are deemed unsuitable for motion detection. A motion adaptive post processor 216 receives frames from the frame rate up-conversion unit 210 and reduces or eliminates artifacts in the video data associated with motion of objects in the video data, as will be explained below.

Frames of video data from the motion adaptive post processor 216 are stored in a frame buffer 218. The frames are presented at the output of the buffer at a higher frame rate video 220. The frame rate of higher frame rate video 220 is higher than the frame rate of the lower frame rate video data 204, due to frame rate up-conversion. The higher frame rate video 220 is displayed by the video display 114. In some embodiments, the video receiver 102 includes memory 224 to store processor instructions to be executed by a processor within the video receiver 102 to perform video processing functions as described herein. For example, the frame rate up conversion unit 210, the motion estimation engine 212, and the motion adaptive post processor 216, may be implemented as a processor executing instructions to perform the described functions. Alternatively, or in addition, the frame rate up conversion unit 210, the motion estimation engine 212, and or the motion adaptive post processor 216 may include hardware components such as specific circuitry, or field programmable gate arrays (FPGA).

Figure 3:
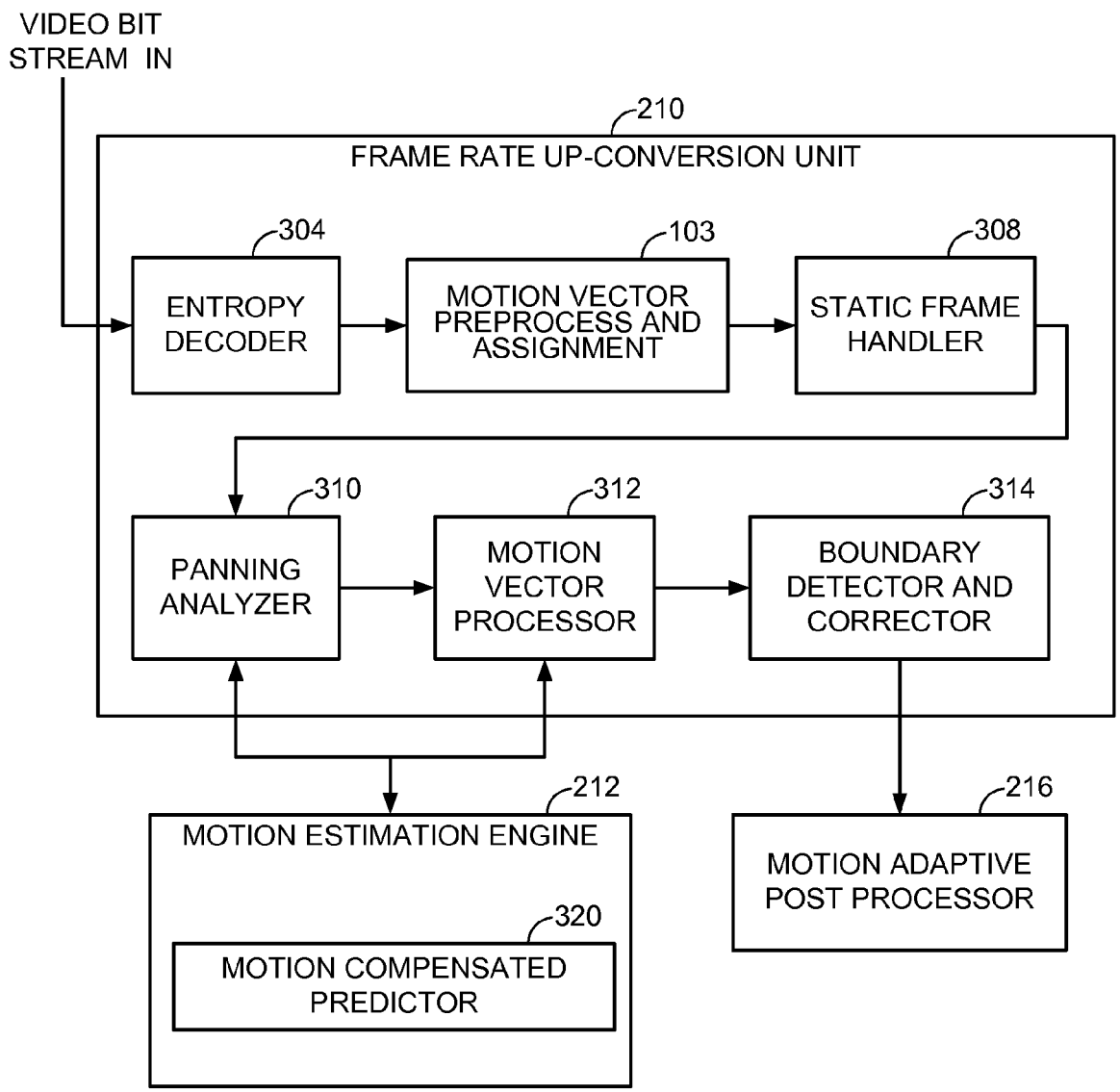
FIG. 3 is a block diagram of an embodiment of a frame rate up-conversion unit.

FIG. 3 shows an embodiment of the frame rate up-conversion unit 210, the motion estimation engine 212, and the motion adaptive post processor 216. In one embodiment, the frame rate up-conversion unit 210 receives lower frame rate video data from the receiver interface 208. In some embodiments, the receiver interface 208 is a wireless transceiver. In another embodiment, the video data is received by way of wireline. An entropy decoder 304 receives the video data and performs entropy decoding of the data. The motion vector preprocessing and assignment module 103 receives the decoded video data and assigns motion vectors to intra-blocks of the data based on the values of motion vectors in neighboring inter-blocks, as described above. In some embodiments, the frame rate up-conversion unit 210 segments the data into blocks of data, such as data corresponding to 4×4 blocks of pixels.

A static frame handler 308 detects if a frame is static with respect to an adjacent frame. Generally, a frame is static if there is substantially no motion between the frame and an adjacent frame. If a frame is deemed to be static, a process of frame rate up-conversion does not occur for the static frames, since the static frame may be replayed. When a frame rate up-conversion does not have to take place, a power consumption during the frame rate up-conversion as well as power consumed when sending the interpolated frame data to display may be saved. For video data that is not static, a panning analyzer 310 determines if panning is present in the data and, if so, causes the motion estimation engine 212 with a motion compensated predictor 320 to perform motion compensated prediction. In another embodiment the panning analysis can help the motion vector processor unit 312 to yield better motion vectors. Determining when panning is present is further described below with reference to FIGS. 8 and 9.

A motion vector processor 312 assesses spatial continuity and temporal continuity of motion vectors processed by the frame rate up-conversion unit 210 and also makes a decision whether to use processed motion vectors or to perform motion estimation by the motion estimation engine 212. A boundary detector and corrector 314 detects motion vectors of blocks on a boundary of a frame and replaces the detected motion vectors with the motion vectors of adjacent blocks that are not on the boundary. The output of the frame rate up-conversion unit 210 is coupled to the motion adaptive post processor 216 to remove or reduce undesirable artifacts from being displayed when the video content is displayed.

Figure 4:
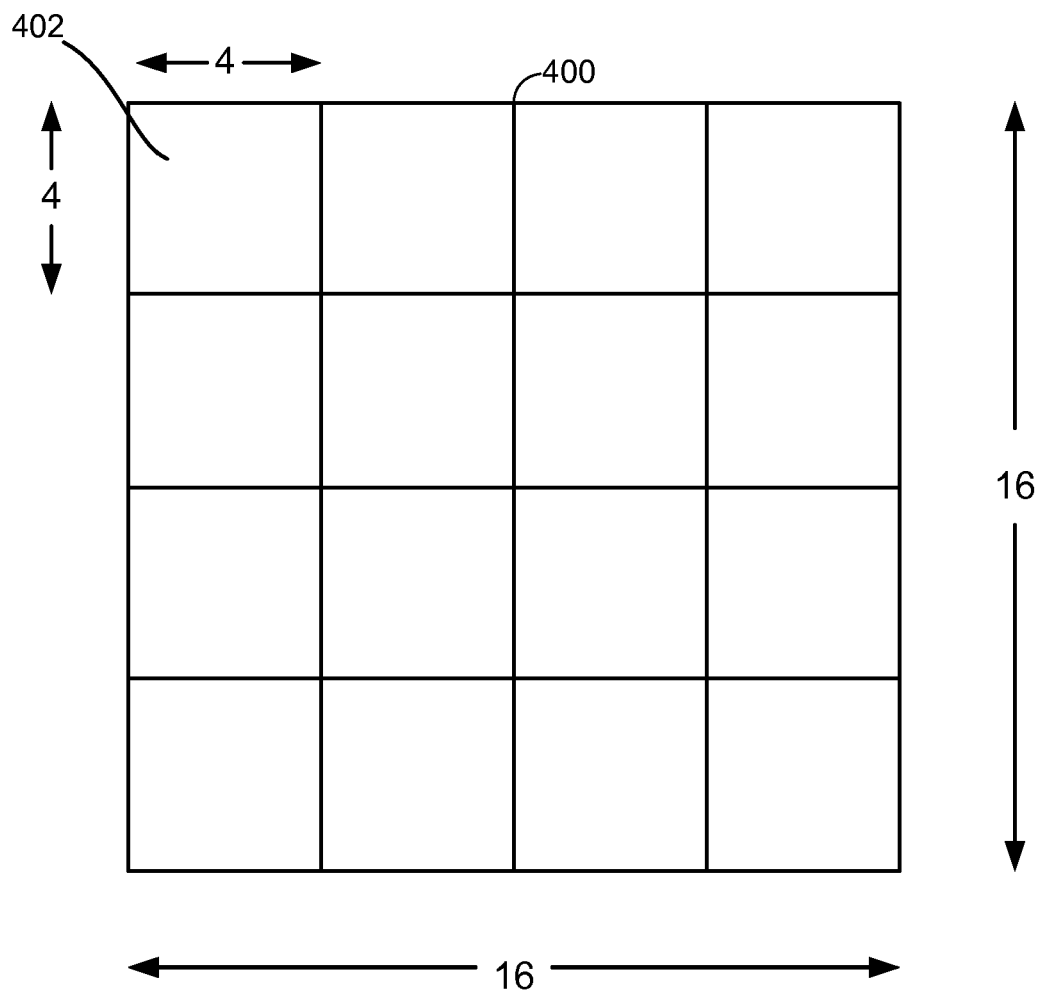
FIG. 4 is a block diagram of a macro block subdivided into smaller blocks for processing.

FIG. 4 is an illustration of an embodiment of a macro block 400 subdivided into smaller blocks for processing. In a received data stream, each frame of video data may be partitioned into 16×16 pixel macro blocks, such as the macro block 400. In some embodiments described herein, each macro block is further subdivided into 4×4 pixel blocks, such as a representative block 402. Subdividing into smaller blocks enables detection of motion of smaller objects.

Figure 5:
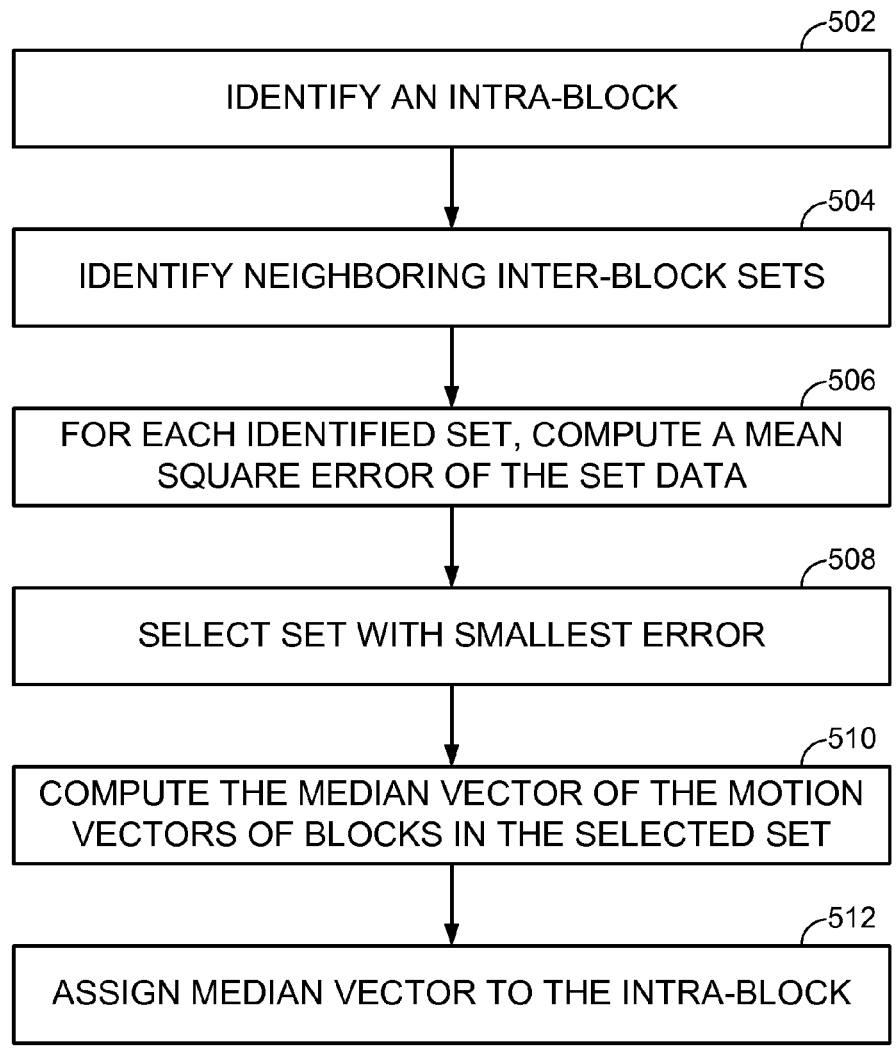
FIG. 5 is a flow chart of an embodiment of a method of motion vector preprocessing and assignment.

FIG. 5 is a flow chart of an embodiment of a method of motion vector preprocessing and assignment. In a particular embodiment, the method may be performed by the motion vector preprocessor and assignment module 103 of FIGS. 1-3. An intra-block is identified, at 502. Neighboring inter-block sets are identified, at 504. For each identified set of neighboring inter-blocks, a mean square error of the data of the neighboring inter-blocks in a set is computed for each set, at 506. The set with the least error is selected, at 508. A median of the motion vectors of the blocks of the selected set is computed, at 510. The median vector is assigned to the intra-block by associating the median vector with the intra-block, at 512.

Figure 6:
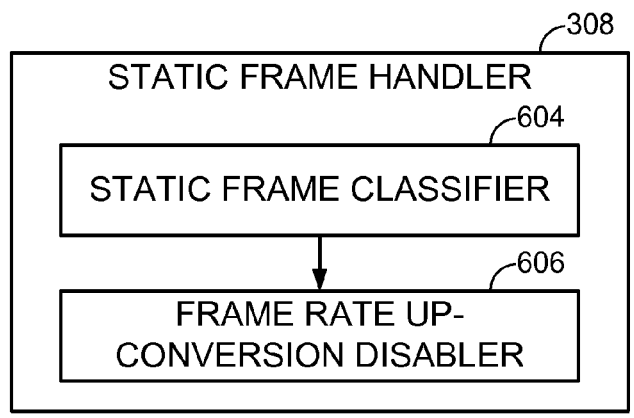
FIG. 6 is a block diagram of an embodiment of a static frame handler.

FIG. 6 is a block diagram of an embodiment of the static frame handler 308 described in FIG. 3. The static frame handler includes two components: a static frame classifier 604 and a frame rate up-conversion disabler 606. The static frame classifier 604 of the static frame handler 308 classifies a frame as static if there is substantially no motion from frame to frame within a sequence of received frames, such as where a determined amount of motion is less than a threshold. When a static frame is detected, the frame rate up-converter disabler 606 disables the process of frame rate up-conversion on the static frames, and the static frame may be duplicated. In other embodiments, the static frame handler can be followed by a frame interpolation decision block, which decides whether to perform frame rate up conversion or not through motion and quality analysis.

Figure 7:
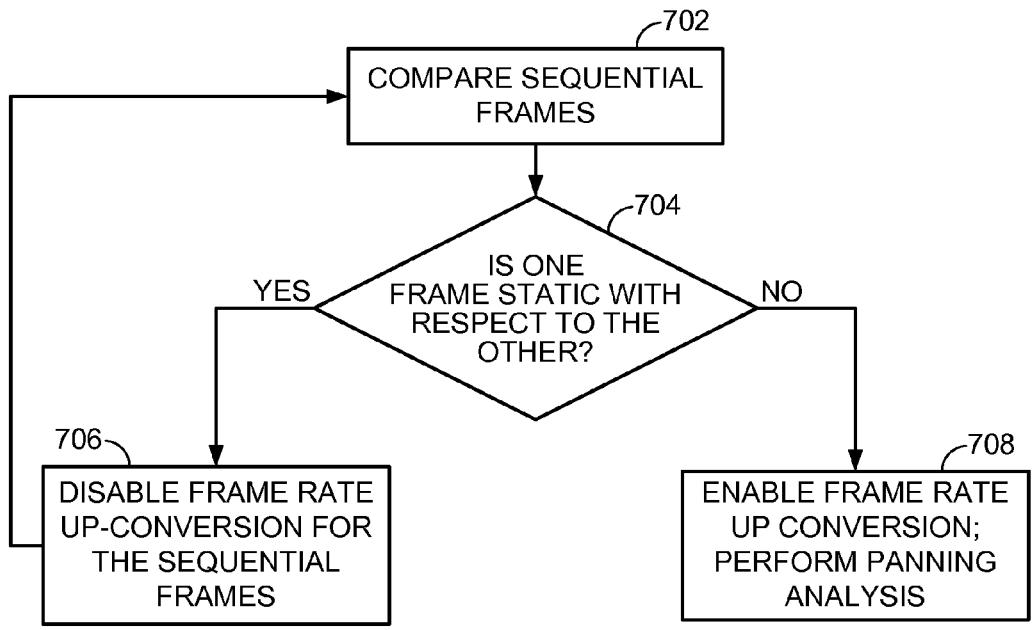
FIG. 7 is a flow chart of an embodiment of a method of handling static frames.

FIG. 7 is a flow chart of an embodiment of a method for handling static frames. In an illustrative embodiment, the method may be performed by the static frame handler 308. Sequential frames are compared to determine if a frame is static, at 702. Thus, by comparing frames, one frame may be determined to be static with respect to the other frame in a sequence of frames, at 704. If a static frame is detected, frame rate up-conversion is disabled for the sequential frames, at 706. Otherwise, the process continues with panning analysis, at 708, to be discussed below.

As functionally described with respect to FIG. 7, some embodiments include a static frame handler to determine when a video frame of the video data is static, and selectively suspending a process of frame rate up-conversion when a static video frame is detected. In accordance with another embodiment, a method includes determining if content of a frame of the video data is static. When content is found to be static, frame rate up-conversion may be disabled.

Figure 8:
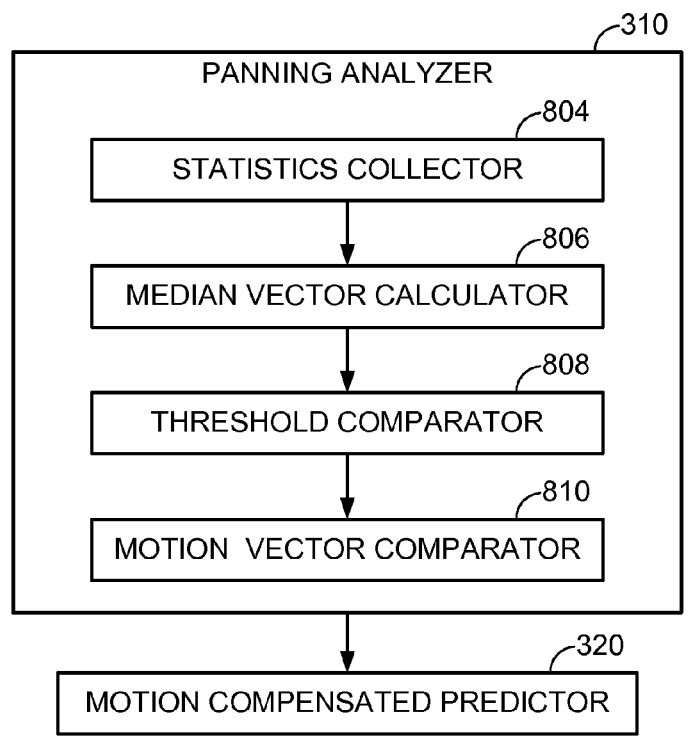
FIG. 8 is a block diagram of an embodiment of a panning analyzer.

FIG. 8 is a block diagram of an embodiment of the panning analyzer 310 of FIG. 3. The panning analyzer 310 includes a statistics collector 804 to collect statistics of the motion vectors of a frame, such as maximum value, mean value and variance. Statistics that the statistics collector 804 collects are used to determine if panning is exhibited by the video data. For example, if a panning metric, such as mean value, is above a pre-determined level, and the variance of the x and y components of the motion vectors is less than a threshold, panning may be determined. A median vector calculator 806 determines the median of motion vectors of a frame to produce a panning vector. A threshold comparator 808 determines if the panning vector exceeds a threshold. Also, a motion vector comparator 810 compares each motion vector in a frame to the panning vector to determine if the block corresponding to the motion vector is being panned. If panning is detected, then the motion compensated predictor 320 may perform bidirectional motion compensated prediction or other panning-adaptive prediction, instead of performing unidirectional motion compensated prediction. Bidirectional motion compensated prediction may result in improved accuracy of temporal frame prediction.

Thus, an embodiment may include a panning analyzer to determine when the video data exhibits panning motion, and a bidirectional motion compensated predictor to perform bidirectional motion compensated prediction when panning is determined.

Figure 9:
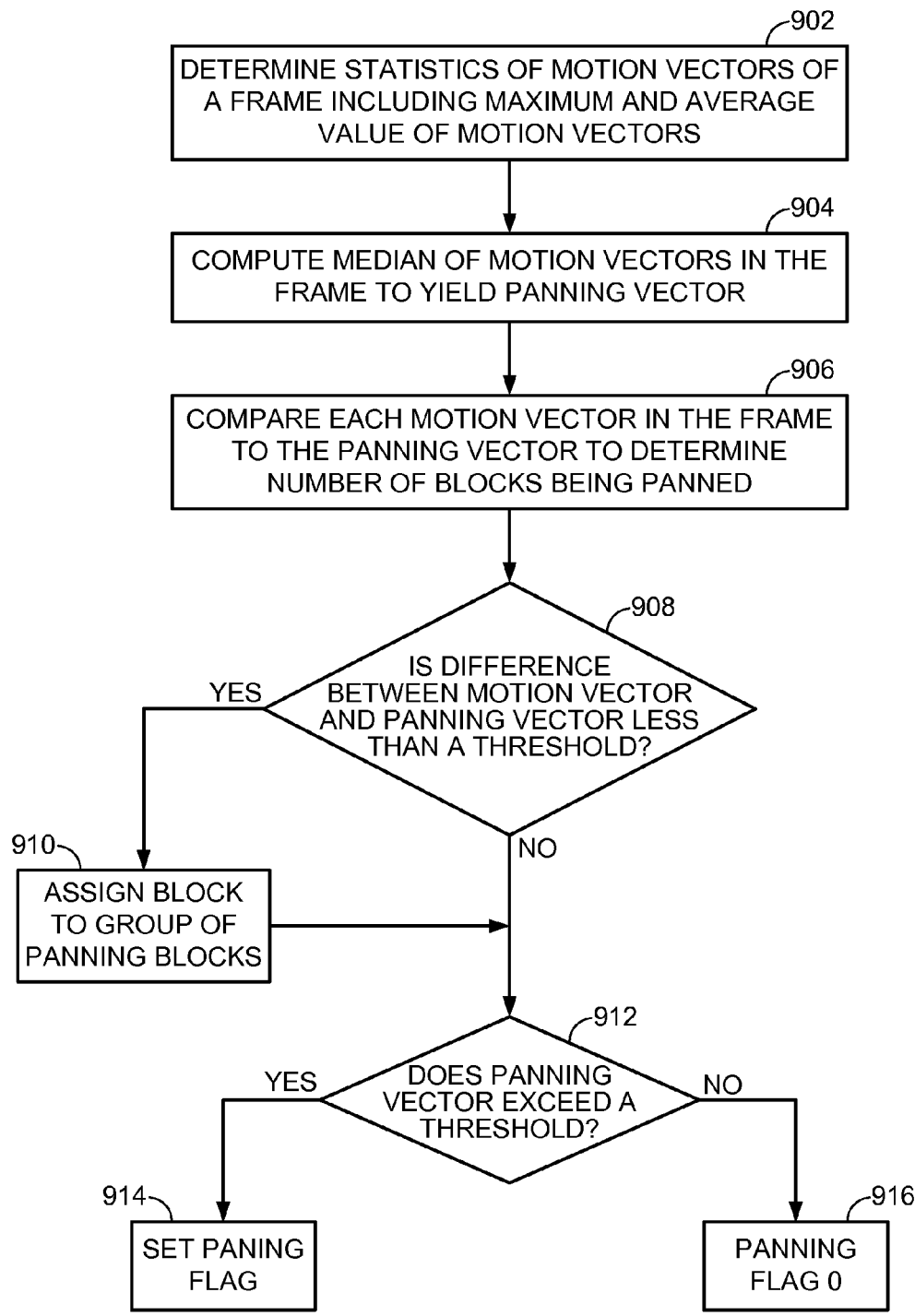
FIG. 9 is a flow chart of an embodiment of a method of panning analysis.

FIG. 9 is a flow chart of an embodiment of a method for panning analysis. In an illustrative embodiment, the method may be implemented by the panning analyzer 310. The statistics of motion vectors of a frame are determined, at 902. These statistics may include maximum and average values of the motion vectors of the frame. A median of motion vectors in the frame is computed to yield a panning vector, at 904. Each motion vector in the frame is compared to the panning vector to determine a number of blocks being panned, 906. Thus, the difference between a motion vector and the panning vector is compared to a pre-determined threshold, at 908. If the difference is less than the predetermined threshold selected to identify panning between the frames, then the block corresponding to the motion vector is assigned to the group of panning blocks, at 910. Otherwise, the process advances to determine if the panning vector exceeds a threshold, at 912. If the panning vector exceeds the threshold, then a panning flag is set, at 914. If the panning vector does not exceed the threshold, the panning flag remains zero, at 916.

As in FIG. 9, an embodiment may be a method that includes determining whether a frame of the video data exhibits panning motion, and performing a bidirectional motion-compensated prediction of a block in a subsequent frame of the video data when panning motion is exhibited.

Figure 10:
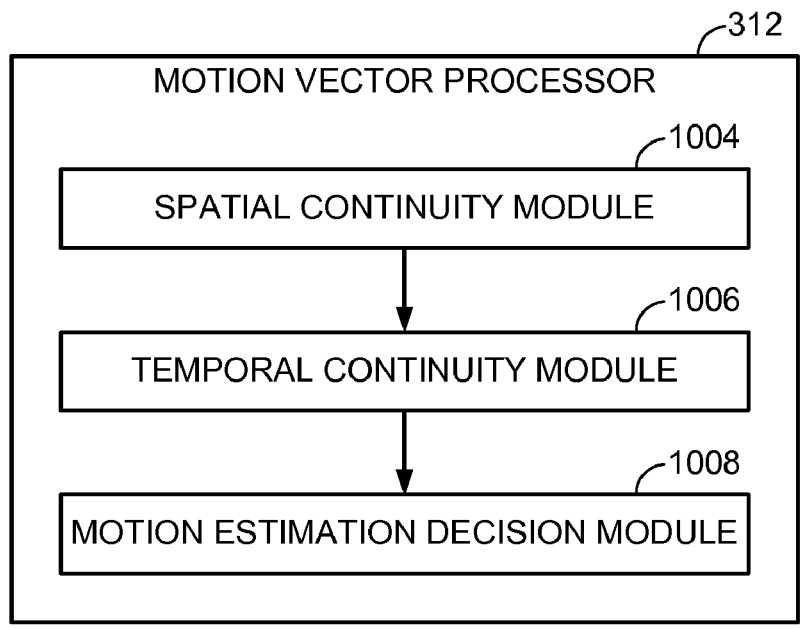
FIG. 10 is a block diagram of an embodiment of a motion vector processor.

FIG. 10 is a block diagram of an embodiment of the motion vector processor 312. The motion vector processor 312 includes a spatial continuity module 1004, a temporal continuity module 1006, and a motion estimation decision module 1008. Spatial continuity module 1004 assesses continuity of motion vectors by comparing a motion vector of a center block to motion vectors of the adjacent blocks. Temporal continuity module 1006 assesses continuity of the motion vector of a block in one frame to the motion vector of a corresponding block in another frame. Motion estimation decision module 1008 determines whether to perform motion estimation to determine a motion vector for the block or to use the processed motion vector determined by the motion vector pre-processing and assignment module 103.

Figure 11:
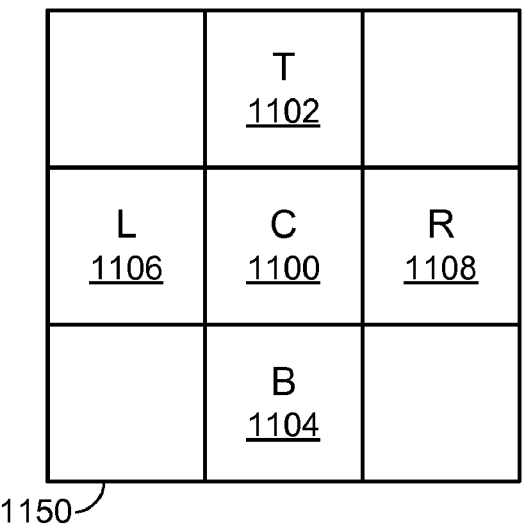
FIG. 11 is a block diagram of blocks adjacent to a center block.

FIG. 11 is an illustration of blocks within a frame used to describe an embodiment of determining spatial continuity among blocks. In a set of blocks 1150, a plurality of blocks is positioned adjacent to a center block C 1100. In FIG. 11, a center block C 1100 is adjacent to a top block T 1102, a bottom block B 1104, and side blocks L 1106 and R 1108. Spatial continuity is assessed using these adjacent blocks T 1102, B 1104, L 1106 and R 1108, as will be described with reference to FIG. 12. If the difference between the motion vectors of adjacent blocks is small, but the difference between the average of the motion vectors of the adjacent blocks and the motion vector of the center block is large, then the processed motion vector of the center block may not be used, and the average of adjacent motion vectors may be used instead.

Figure 12:
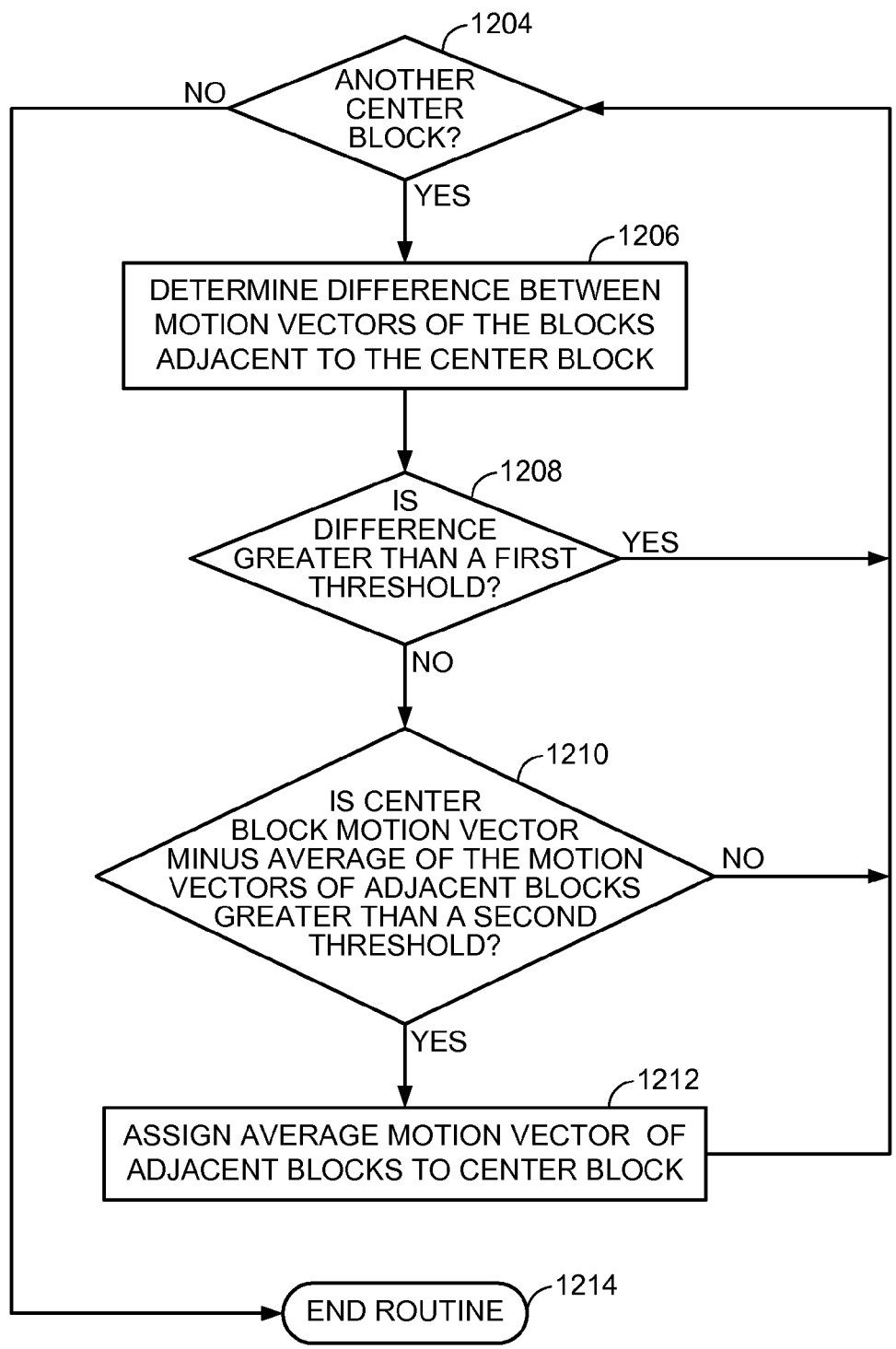
FIG. 12 is a flow chart of an embodiment of a method of assessing spatial continuity of motion vectors.

FIG. 12 is a flowchart of an embodiment of a method of assessing spatial continuity of motion vectors. In an illustrative embodiment, the method may be performed by the motion vector processor 312 of FIG. 3. If a center block, such as the center block C 1100 of FIG. 11, that has not been analyzed for spatial continuity is determined to be remaining in the frame, at 1204, then a difference between the motion vector of one adjacent block and the motion vector of the adjacent block to the opposite side of the center block is determined, at 1206. For example, the difference between the motion vectors of block L 1106 and R 1108 in FIG. 11 is determined. The difference is compared to a first threshold, at 1208. If the difference exceeds the first threshold, then the next center block is evaluated at 1204. If no center blocks remain, the process ends at 1214. If the difference does not exceed the first threshold, then the motion vector of the center block is compared to the average value of the motion vectors of the adjacent blocks to determine if a second threshold is exceeded, at 1210. For example, the motion vector of block C 1100 is compared to, such as subtracted from, the average value of the motion vectors of blocks L 1106 and R 1108. If the second threshold is not exceeded, the next center block is evaluated, at 1204. If the second threshold is exceeded, the average of the motion vectors of the adjacent blocks is assigned to the center block, at 1212. For example, in the example of FIG. 11, the motion vector of block C 1110 may be assigned to be the average of the motion vectors of blocks L 1106 and R 1108.

As functionally described with respect to FIG. 12, some embodiments include comparing a first difference between motion vectors of two blocks that are adjacent to a center block to a first threshold. When the first difference is less than the first threshold then it is determined if a second difference between the motion vector of the center block and an average motion vector of motion vectors of the adjacent blocks exceeds a second threshold. When the second difference exceeds the second threshold, then a motion vector is assigned to the center block that is an average of the motion vectors of the adjacent blocks.

Figure 13:
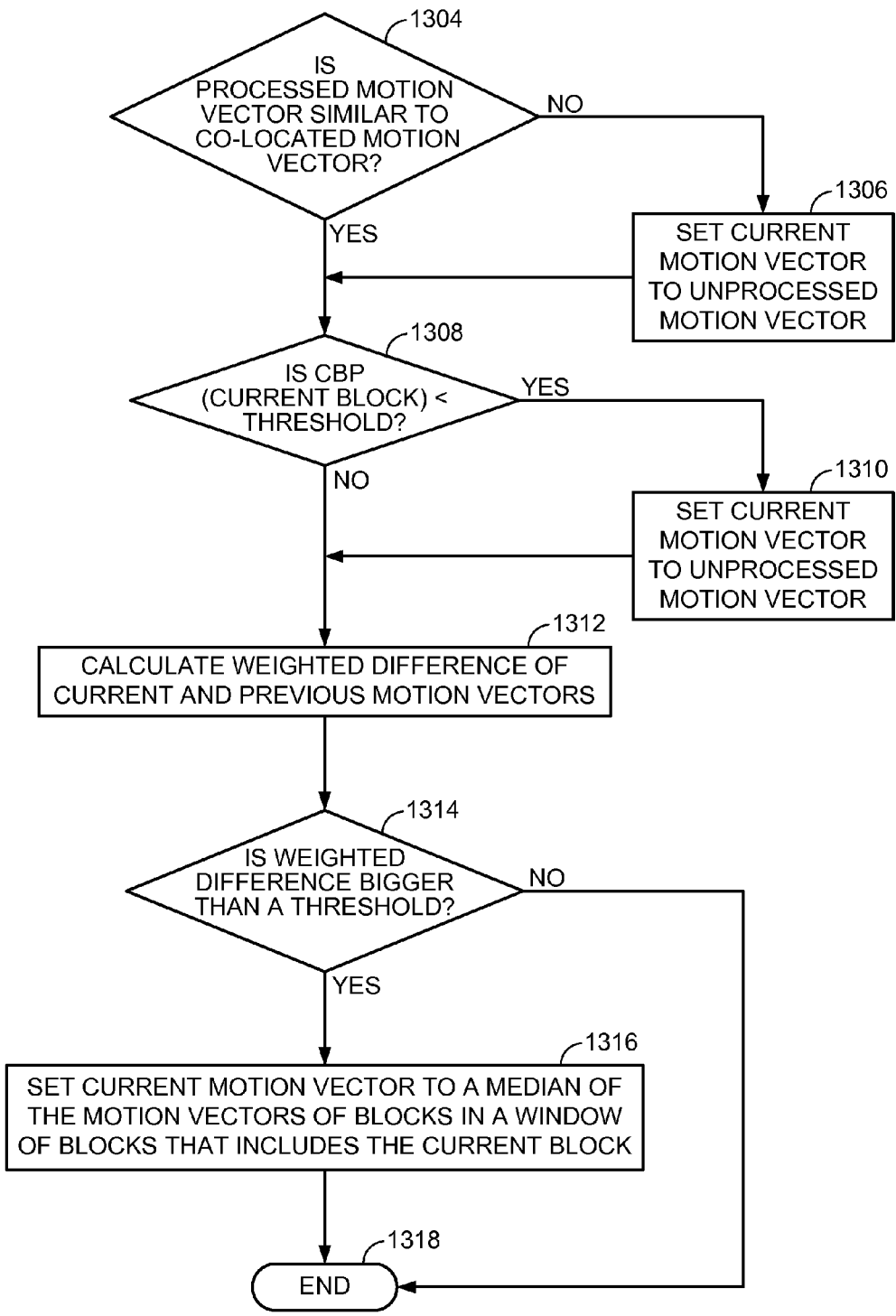
FIG. 13 is a flow chart of an embodiment of a method of assessing temporal continuity of motion vectors.

FIG. 13 is a flowchart of an embodiment of a method of assessing temporal continuity of motion vectors. In an illustrative embodiment, the method may be performed by motion vector processor 312 of FIG. 3. A comparison is made to determine if a processed motion vector of a current block is similar to the motion vector of a corresponding block in an adjacent or nearby frame, at 1304. Similarity may be determined by comparing the difference between the two motion vectors to a threshold. If the two motion vectors are similar, the process continues at 1308. If the two motion vectors being compared are not similar, i.e., if the difference of the two motion vectors exceeds the threshold, the motion vector of the current block is set equal to the unprocessed motion vector received in the video data bit stream received by video receiver 106 corresponding to the current block at 1306.

A coded block pattern (CBP) of the current block is compared to a threshold at 1308. If the CBP is less than the threshold, then at 1310, the processed motion vector of the current block is set to the unprocessed motion vector received in the video data bit stream corresponding to the current block. Advancing to 1312, a weighted difference of the motion vector of the current block and the motion vector of the corresponding block in an adjacent frame is calculated. The weighted difference scheme may also involve taking the difference of the motion vector of the current block from the motion vector obtained by weighted averaging of motion vectors from a reference co-located block and its neighbors. Continuing to 1314, the weighted difference is compared to a second threshold. If the weighted difference is not greater than the second threshold, the process ends at 1318. Otherwise, the motion vector of the current block is set equal to a median motion vector that is the median of the motion vectors of blocks in a window of blocks that contains the current block as the center block of the window. In some embodiments, the window includes a three by three array of blocks.

Figure 14:
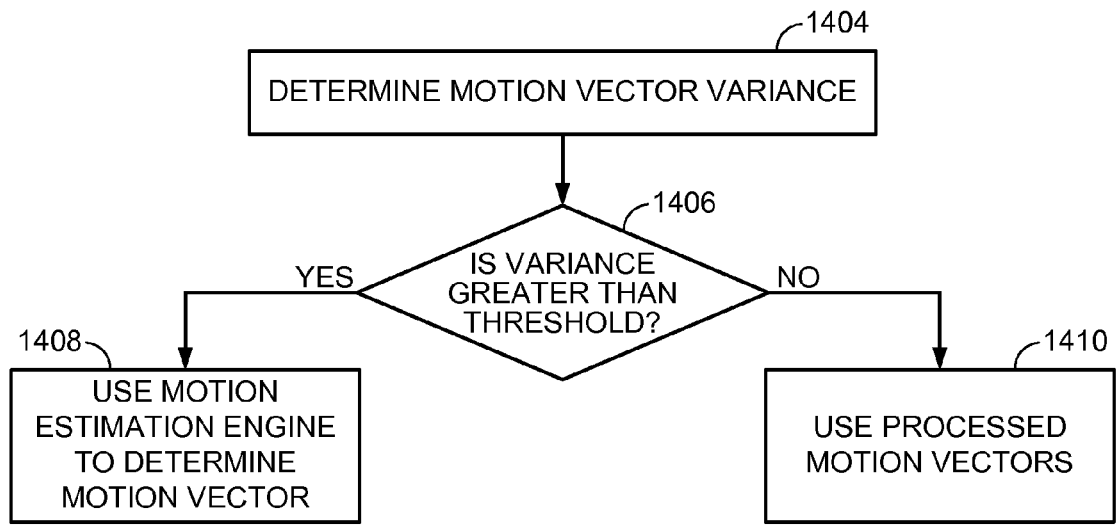
FIG. 14 is a flow chart of an embodiment of a method of selecting between using processed motion vectors and computing motion vectors using a motion estimation engine.

FIG. 14 is a flowchart of an embodiment of a method of selecting between using processed motion vectors and computing motion vectors using the motion estimation engine 112. In an illustrative embodiment, the method may be performed by the motion vector processor 312 of FIG. 3. The variance of the motion vectors in a frame is determined at 1404. In other embodiments, a statistical metric other than the variance may be employed. The variance of the motion vectors is compared to a threshold, at 1406. If the variance is greater than the threshold, then at 1408, motion estimation engine 112 is used to determine motion vectors for the frame. Otherwise, if the variance is not greater than the threshold, then the processed motion vectors of the frame are used, at 1410. Other metrics may also be used to decide when to turn on the motion estimation engine. These metrics include the number of intra blocks in the bit-stream, the cluster of intra-blocks, and other motion vector statistics such as motion vectors lengths and motion vector histogram.

Figure 15:
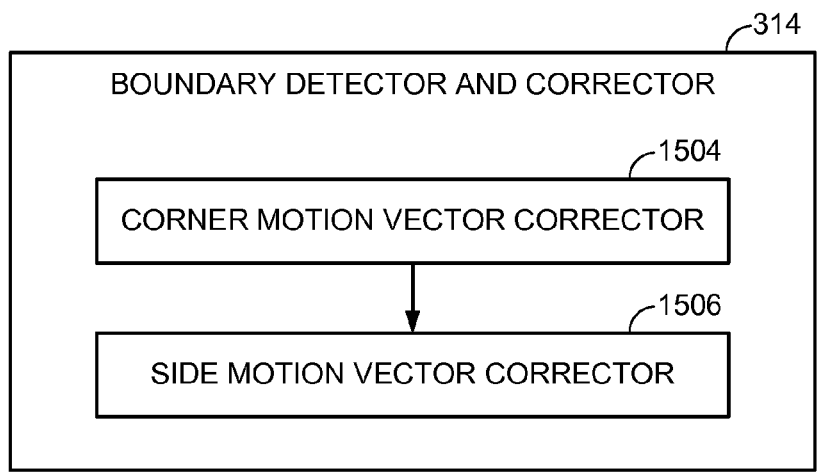
FIG. 15 is a block diagram of an embodiment of a boundary detector and corrector.

FIG. 15 is a block diagram of a particular embodiment of the boundary detector and corrector 314. The boundary detector and corrector 314 includes a corner motion vector corrector 1504 to detect and correct a motion vector of a corner block and a side motion vector corrector 1506 to detect and correct a motion vector of a side block. As will be discussed with reference to FIG. 16, the boundary detector and corrector 314 corrects erroneous motion vectors of blocks on a boundary of a frame or a macro block. Typically, erroneous motion vectors occur at the frame boundaries due to objects/pixels leaving or entering the frame and it is hard to find correspondence to those objects in the reference frames.

FIG. 16 is an illustration of blocks adjacent to a boundary of a frame or macro block to illustrate an operation of the boundary detector and corrector 314. For example, block A 1601 is a corner block and block E 1602 is a side block. The neighbors of block A 1601 are blocks B 1603, C 1605, and D 1607. The neighbors of block E 1602 that are not on the boundary are blocks F 1606, G 1604, and H 1608.

Figure 17:
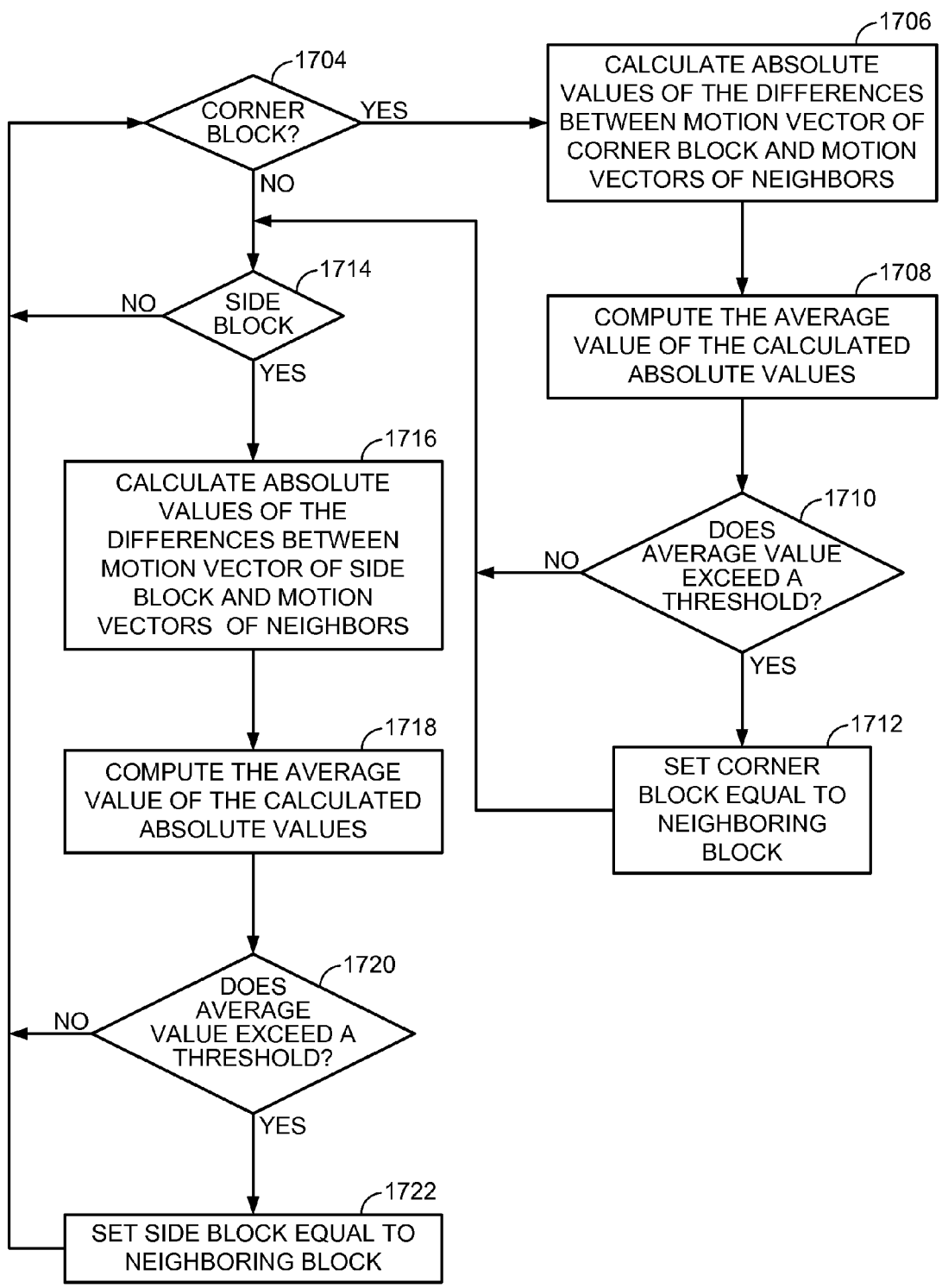
FIG. 17 is a flow chart of an embodiment of a method of detection and correction of boundary motion vectors.

FIG. 17 is a flow chart of an embodiment of a method of detection and correction of boundary motion vectors. In an illustrative embodiment, the method may be performed by the boundary detector and corrector 314 of FIG. 3. Whether a block is a corner block is determined, at 1704. If the block is a corner block, then absolute values of differences between the motion vector of the corner block and adjacent blocks are computed, at 1706. For example, referring to FIG. 16, the method computes absolute values of differences between the motion vector of block A 1601 and the motion vectors of blocks B 1603, C 1605, and D 1607. The average value of the computed absolute values is computed, at 1708. The average value is compared to a threshold, at 1710. If the average value exceeds the threshold, then the motion vector of the corner block is set equal to the motion vector of a neighboring block, at 1712. Values/metrics other than average could be used here as well. In particular, the motion vector of corner block A 1601 may be set equal to the motion vector of neighboring block D 1607. Otherwise, the process proceeds at 1714.

The process continues to determine if a side block is detected, at 1714. If a side block is not detected, the process continues with a next block, at 1704. If a side block is detected, then absolute values of differences between the motion vector of the side block and adjacent blocks are computed, at 1716. Referring to FIG. 16, the method may compute the absolute values of the differences between the motion vector of block E 1602 and the motion vectors of blocks F 1606, G 1604 and H 1608. The average value of the computed absolute values is computed, at 1718. The average value is compared to a threshold, at 1720. If the average value exceeds the threshold, then the motion vector of the side block is set equal to the motion vector of a neighboring block at 1722. For example, the motion vector of the side block E 1602 may be set equal to the motion vector of neighboring block F 1606. The process continues for a next block at 1704.

Figure 18:
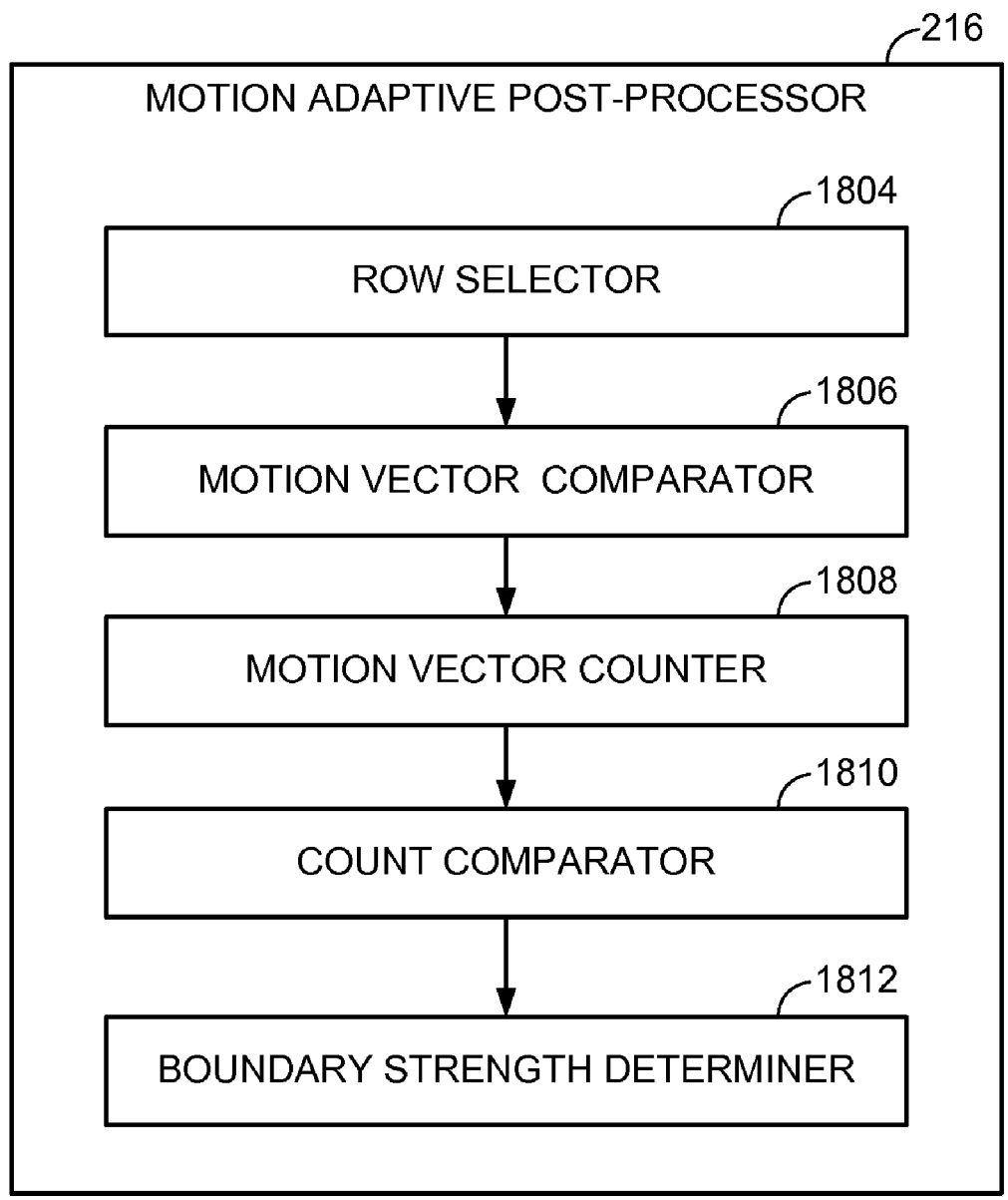
FIG. 18 is a block diagram of an embodiment of a motion adaptive post-processor.

FIG. 18 is a block diagram of an embodiment of a motion adaptive post-processor 216 described with reference to FIG. 2. The motion adaptive post processor 216 is configured to reduce blocking artifacts which are erroneous pixel values as a consequence of processing the image by blocks. More particularly, the motion adaptive post processor 216 determines a boundary strength for each block which determines a strength of filtering applied to the block. The motion adaptive post processor 216 includes a row selector 1804 to select one row of blocks in a frame at a time. A motion vector comparator 1806 compares the motion vectors of each block in the row to a threshold. A motion vector counter 1808 counts the number of motion vectors in the row that exceed a threshold. A count comparator 1810 compares the total number of motion vectors that exceed the threshold to a second threshold. If the count exceeds the second threshold, then a boundary strength determiner 1812 determines boundary strengths for each block in the selected row. Thus, an embodiment of an apparatus may include the motion adaptive post processor 216 to assess a boundary strength associated with a block.

Figure 19:
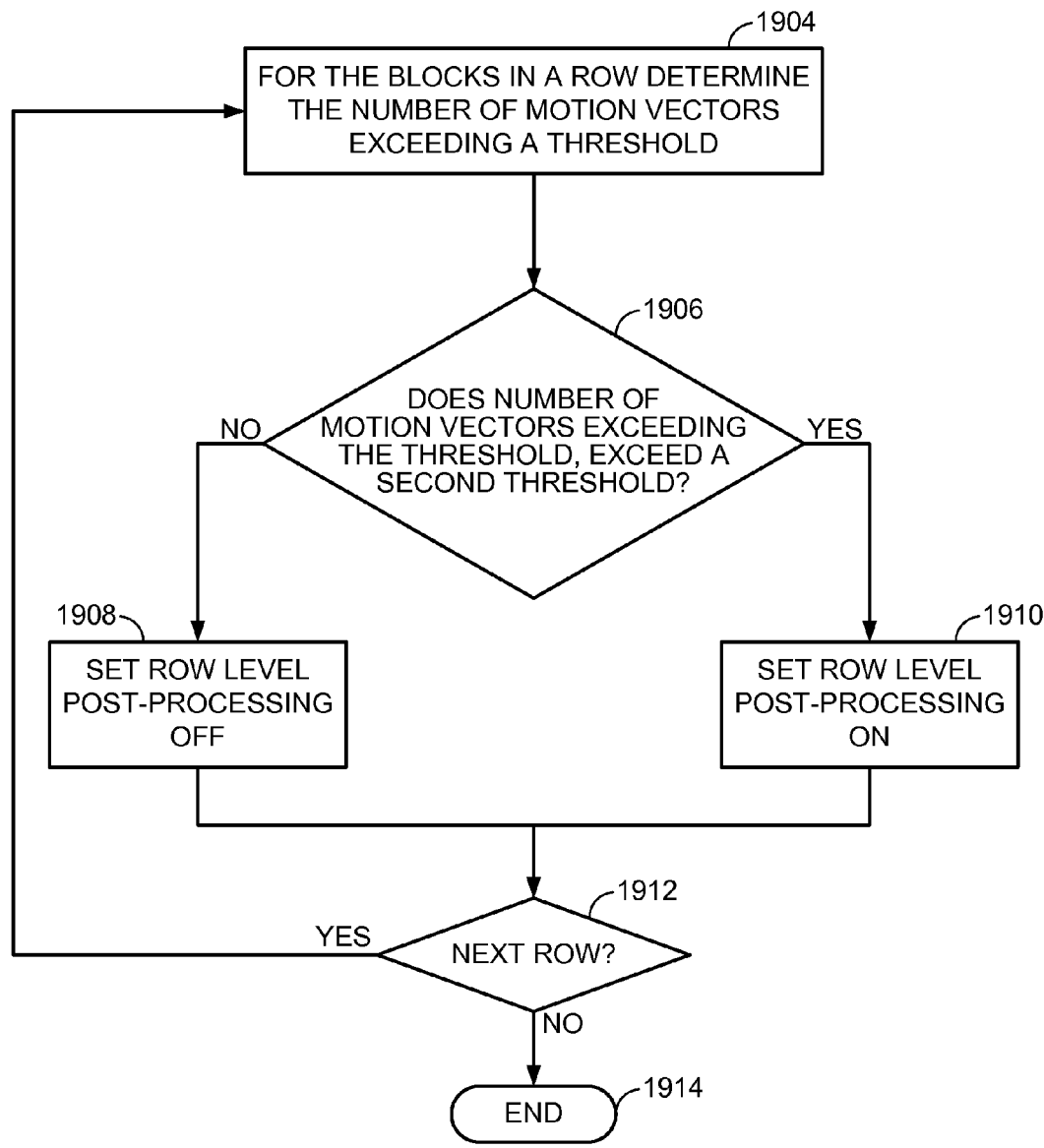
FIG. 19 is a flow chart of an embodiment of a method of row level post-processing.

FIG. 19 is a flow chart of an embodiment of a method of row-level post-processing. In an illustrative embodiment, the method may be performed by the motion adaptive post processor 216 of FIG. 3. The number of motion vectors of blocks in a row that exceed a first threshold is determined, at 1904. The number of motion vectors that exceed the first threshold is compared to a second threshold, at 1906. If the number of motion vectors that exceeds the first threshold does not exceed the second threshold, then row level post-processing is turned off, at 1908. Otherwise, row level post-processing is turned on, at 1910. A determination is made whether there are any remaining rows, at 1912. If so, a next row is processed, at 1904.

Figure 20:
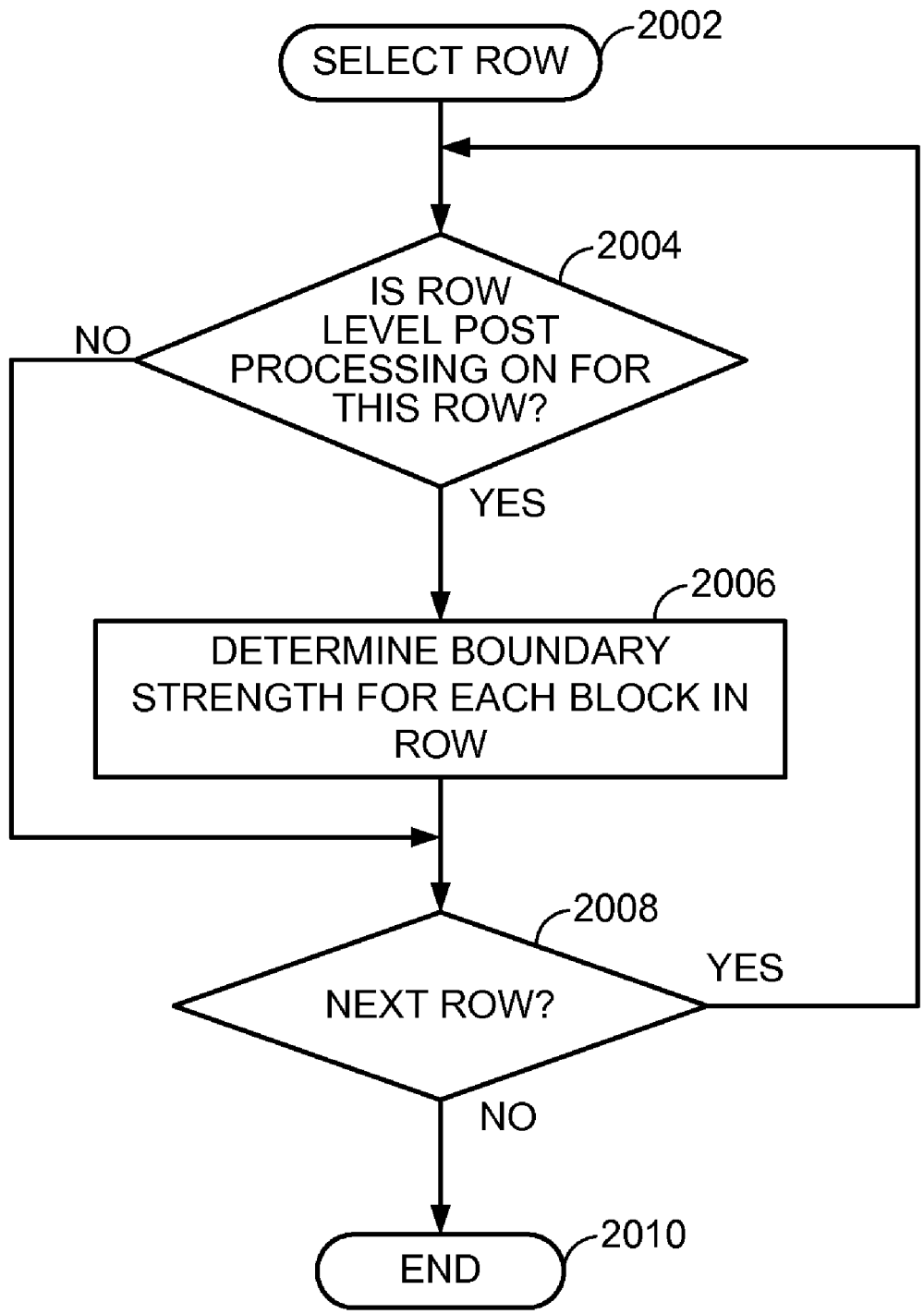
FIG. 20 is an embodiment of an embodiment of a method for assigning boundary strength values.

FIG. 20 is an embodiment of method of assigning boundary strength values. In an illustrative embodiment, the method may be performed by the motion adaptive post processor 216 of FIG. 3. At 2004, a determination is made whether row level post processing is turned on for a particular row. If row level post processing is turned off for the row, a determination is made whether there is another row, at 2008. If there is another row, the process continues, at 2004. Otherwise, the process ends at 2010. Continuing at 2004, if row level post-processing is turned on, the process advances to 2006, where boundary strengths for the blocks in the row are determined according to whether the motion vector for a block exceeds a threshold. Advancing to 2008, a determination is made whether there is another row to be processed. If so, the process continues at 2004. Otherwise, the process ends at 2010. In applications where processing power is abundant row-level decision can be discarded, and motion-adaptive boundary strength can be calculated or each block and for each row of a to-be-interpolated frame.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

In accordance with some embodiments, a portion of one or more of the disclosed methods may be implements as a computer readable tangible medium that includes computer code to cause a computer, such as a general purpose processor or digital signal processor (DSP), to identify an intra-block and to derive a motion vector to assign to the intra-block from neighboring blocks. The medium includes computer code that causes a computer to identify an intra-block in a received stream of video data, wherein the intra-block has no motion vector associated with it in the received stream of video data. The medium further includes computer code that causes the computer to determine at least one set of inter-blocks neighboring the intra-block. The computer code also causes the computer to determine an error associated with vectors of motion blocks in the at least one set. The medium further includes computer code that causes the computer to select a set with a least error among the at least one set or to select the only set if only one set is identified. The computer code also causes the computer to determine a median motion vector from motion vectors of the inter-blocks in the selected set. The medium also includes computer code that causes the computer to associate the median motion vector with the intra-block.

In some embodiments, the medium further includes computer code that causes the computer to detect panning motion in the video data and to perform bidirectional motion compensated prediction when panning motion is detected. In some embodiments, the computer code causes the computer to determine if content of a frame of the video data is static and to disable frame rate up-conversion when the content of the frame is determined to be static. Further, in some embodiments, the computer code causes the computer to assess spatial continuity of a block of the video data by comparing a motion vector of the block to motion vectors of adjacent blocks. Also, in some embodiments, the computer code causes the computer to determine a difference between a processed motion vector of a block to a motion vector of a corresponding block in a previous frame to assess a temporal continuity associated with the processed motion vector.

Thus, some or all of the methods described herein may be performed by a computer which may include a microprocessor or micro-controller. Some or all of the methods may, alternatively, or in addition, be performed by application specific integrated circuitry, or by programmable logic arrays.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of processing received video data in a video receiver, the method comprising:
    identifying an intra-block in a video frame of the video data;
    identifying a first set of inter-blocks neighboring the intra-block and identifying a second set of inter-blocks neighboring the intra-block, each of the inter-blocks in the first and second sets having a motion vector associated therewith;
    evaluating data of the first set of inter-blocks and of the second set of inter-blocks to determine which of the first and second set of inter-blocks has a least error associated therewith;
    determining a motion vector associated with the motion vectors of the set of inter-blocks determined to have the least error, the determined motion vector to be associated with the intra-block;
    comparing a first difference between motion vectors of two blocks that are adjacent to a center block to a first threshold;
    in response to the first difference being less than the first threshold, determining whether a second difference between a motion vector of the center block and an average motion vector of motion vectors of the two blocks exceeds a second threshold; and
    in response to the second difference exceeding the second threshold, assigning a motion vector to the center block that is an average of the motion vectors of the two blocks.

2. The method of claim 1, wherein at least one of the sets of inter-blocks comprises a corner pattern of inter-blocks neighboring the intra-block.

3. The method of claim 1, wherein at least one of the sets of inter-blocks comprises a side pattern of inter-blocks neighboring the intra-block.

4. The method of claim 1, wherein each inter-block in the first and second sets of inter-blocks represents four by four groups of pixels.

5. The method of claim 1, further comprising:
    determining whether content of the video frame of the video data is static; and
    disabling frame rate up-conversion in response to determining that the content of the frame is static.

6. The method of claim 1, further comprising:
    determining whether the video frame exhibits a panning motion; and
    performing a panning-adaptive prediction of a block in a subsequent video frame in response to a determination that the panning motion is exhibited.

7. The method of claim 6, wherein panning motion is identified based on statistics of motion vectors associated with the video frame.

8. The method of claim 6, wherein an amount of panning is determined based on a median value of motion vectors associated with the video frame.

9. The method of claim 6, further comprising computing a difference between a panning vector and a motion vector for each of a plurality of blocks in the video frame to determine a number of blocks exhibiting the panning motion.

10. The method of claim 6, further comprising, in response to determining that the video frame exhibits the panning motion, deriving motion vectors for the video frame by using panning motion.

11. The method of claim 1, further comprising selecting between use of motion vectors provided in a received video bit stream to predict motion and use of motion compensated prediction at the video receiver to determine motion vectors, based upon a comparison of a measured parameter of the video bit stream to a threshold.

12. The method of claim 1, further comprising determining a boundary strength for each block in a row.

13. The method of claim 1, further comprising:
    determining a number of motion vectors of blocks in a first row of blocks that exceeds a first threshold;
    determining whether the number of motion vectors that exceeds the first threshold exceeds a second threshold; and
    in response to the number of motion vectors that exceeds the first threshold exceeding the second threshold, determining a boundary strength for each block in the first row.

14. A method of processing received video data in a video receiver, the method comprising:
    identifying an intra-block in a video frame of the video data;
    identifying a first set of inter-blocks neighboring the intra-block and identifying a second set of inter-blocks neighboring the intra-block, each of the inter-blocks in the first and second sets having a motion vector associated therewith;
    evaluating data of the first set of inter-blocks and of the second set of inter-blocks to determine which of the first and second set of inter-blocks has a least error associated therewith;
    determining a motion vector associated with the motion vectors of the set of inter-blocks determined to have the least error, the determined motion vector to be associated with the intra-block;

calculating a weighted difference between a processed motion vector of a first block of the video frame and a motion vector of a corresponding block of a previous frame of the video data;

comparing the weighted difference to a threshold; and in response to the weighted difference exceeding the threshold, replacing the processed motion vector with a replacement motion vector that is a median value of motion vectors of neighboring blocks in a three block by three block array that includes the first block corresponding to the processed motion vector.

15. The method of claim 14, wherein at least one of the sets of inter-blocks comprises a corner pattern of inter-blocks neighboring the intra-block.

16. The method of claim 14, wherein at least one of the sets of inter-blocks comprises a side pattern of inter-blocks neighboring the intra-block.

17. The method of claim 14, wherein each inter-block in the first and second sets of inter-blocks represents four by four groups of pixels.

18. The method of claim 14, further comprising:
determining whether content of the video frame of the video data is static; and
disabling frame rate up-conversion in response to determining that the content of the frame is static.

19. The method of claim 14, further comprising:
determining whether the video frame exhibits a panning motion; and
performing a panning-adaptive prediction of a block in a subsequent video frame in response to a determination that the panning motion is exhibited.

20. The method of claim 19, wherein panning motion is identified based on statistics of motion vectors associated with the video frame.

21. The method of claim 19, wherein an amount of panning is determined based on a median value of motion vectors associated with the video frame.

22. The method of claim 19, further comprising computing a difference between a panning vector and a motion vector for each of a plurality of blocks in the video frame to determine a number of blocks exhibiting the panning motion.

23. The method of claim 19, further comprising, in response to determining that the video frame exhibits the panning motion, deriving motion vectors for the video frame by using panning motion.

24. The method of claim 14, further comprising selecting between use of motion vectors provided in a received video bit stream to predict motion and use of motion compensated prediction at the video receiver to determine motion vectors, based upon a comparison of a measured parameter of the video bit stream to a threshold.

25. The method of claim 14, further comprising determining a boundary strength for each block in a row.

26. The method of claim 14, further comprising:
determining a number of motion vectors of blocks in a first row of blocks that exceeds a first threshold;
determining whether the number of motion vectors that exceeds the first threshold exceeds a second threshold; and
in response to the number of motion vectors that exceeds the first threshold exceeding the second threshold, determining a boundary strength for each block in the first row.

27. A method of processing received video data in a video receiver, the method comprising:

identifying an intra-block in a video frame of the video data;

identifying a first set of inter-blocks neighboring the intra-block and identifying a second set of inter-blocks neighboring the intra-block, each of the inter-blocks in the first and second sets having a motion vector associated therewith;

evaluating data of the first set of inter-blocks and of the second set of inter-blocks to determine which of the first and second set of inter-blocks has a least error associated therewith;

determining a motion vector associated with the motion vectors of the set of inter-blocks determined to have the least error, the determined motion vector to be associated with the intra-block;

detecting a block adjacent to a boundary of the video frame;

determining an average value of absolute values of differences between a motion vector of the block adjacent to the boundary and motion vectors of blocks that neighbor the block adjacent to the boundary;

comparing the average value to a threshold; and setting the motion vector of the block adjacent to the boundary equal to a motion vector of a block that neighbors the block adjacent to the boundary in response to the average value exceeding the threshold.

28. The method of claim 27, wherein at least one of the sets of inter-blocks comprises a corner pattern of inter-blocks neighboring the intra-block.

29. The method of claim 27, wherein at least one of the sets of inter-blocks comprises a side pattern of inter-blocks neighboring the intra-block.

30. The method of claim 27, wherein each inter-block in the first and second sets of inter-blocks represents four by four groups of pixels.

31. The method of claim 27, further comprising:
determining whether content of the video frame of the video data is static; and
disabling frame rate up-conversion in response to determining that the content of the frame is static.

32. The method of claim 27, further comprising:
determining whether the video frame exhibits a panning motion; and
performing a panning-adaptive prediction of a block in a subsequent video frame in response to a determination that the panning motion is exhibited.

33. The method of claim 32, wherein panning motion is identified based on statistics of motion vectors associated with the video frame.

34. The method of claim 32, wherein an amount of panning is determined based on a median value of motion vectors associated with the video frame.

35. The method of claim 32, further comprising computing a difference between a panning vector and a motion vector for each of a plurality of blocks in the video frame to determine a number of blocks exhibiting the panning motion.

36. The method of claim 32, further comprising, in response to determining that the video frame exhibits the panning motion, deriving motion vectors for the video frame by using panning motion.

37. The method of claim 27, further comprising selecting between use of motion vectors provided in a received video bit stream to predict motion and use of motion compensated prediction at the video receiver to determine motion vectors, based upon a comparison of a measured parameter of the video bit stream to a threshold.

38. The method of claim 27, further comprising determining a boundary strength for each block in a row.

39. The method of claim 27, further comprising:

determining a number of motion vectors of blocks in a first row of blocks that exceeds a first threshold;

determining whether the number of motion vectors that exceeds the first threshold exceeds a second threshold; and in response to the number of motion vectors that exceeds the first threshold exceeding the second threshold, determining a boundary strength for each block in the first row.

* * * * *